Jan. 4, 1966 C. S. MARKS 3,227,296

TREE-CROP PICKING APPARATUS

Filed Sept. 12, 1961 8 Sheets-Sheet 1

INVENTOR.
C. S. MARKS

INVENTOR.
C. S. MARKS

INVENTOR.
C. S. MARKS

INVENTOR.
C. S. MARKS

Jan. 4, 1966 C. S. MARKS 3,227,296

TREE-CROP PICKING APPARATUS

Filed Sept. 12, 1961 8 Sheets-Sheet 5

INVENTOR.
C. S. MARKS

INVENTOR.
C. S. MARKS

INVENTOR.
C. S. MARKS

Jan. 4, 1966 C. S. MARKS 3,227,296

TREE-CROP PICKING APPARATUS

Filed Sept. 12, 1961 8 Sheets-Sheet 8

INVENTOR.
C. S. MARKS

United States Patent Office 3,227,296
Patented Jan. 4, 1966

3,227,296
TREE-CROP PICKING APPARATUS

Cyril S. Marks, 416 S. Gaffey St., San Pedro, Calif.

Filed Sept. 12, 1961, Ser. No. 137,546
4 Claims. (Cl. 214—83.1)

The present invention consists of picking apparatus adapted primarily to pick tree crops and, in particular, being adapted to pick fruit such as citrus fruit, or the like, although the invention is not specifically so limited.

Also, the apparatus is adapted to transport the picked tree crop from the actual picking location to a receptacle carried by a vehicle (usually a truck box carried by a truck, although not specifically so limited.)

Furthermore, the apparatus is adapted, in one preferred form, to additionally transport the picked tree crop from the vehicle to a supplementary trailer or vehicle drawn along the ground adjacent to (usually between) rows of trees bearing the tree crop immediately behind the truck or vehicle until said supplementary trailer or vehicle has been filled with the tree crop, after which it can be controllably dumped from the truck or transferred to another vehicle. Subsequent thereto, power winch means carried by the back of the truck may be connected to a second laterally offset and positioned empty supplementary trailer or vehicle, and said power winch means can then be operated to draw the empty second trailer or vehicle into position behind the truck so that it can be subsequently filled by the tree crop-picking portion of the apparatus of the present invention. It will be understood that the first-mentioned trailer or vehicle, which is full of the previously picked tree crop, and which has been disengaged from the truck by the controllably disengageable hitch means, will then be subsequently picked up and drawn out of the grove of trees for transport to a packing house, or the like.

In addition to the automatic transport arrangement referred to generally above and the arrangement for quickly disengaging from a full trailer or vehicle and re-engaging with respect to an empty trailer or vehicle whereby to provide for quick and easy transport of picked tree crops to a packing house, or the like, the portion of the apparatus of the present invention which is used in picking the tree crops is of a novel construction adapted to effectively support a person who will actually pick the fruit in a manner such that said operator may control his position with respect to a tree whereby he may start at the bottom of the tree and arcuately move along one side thereof or a portion of the circumference of the tree, until he has picked all of the tree crop from that portion, after which he may cause the apparatus to move him slightly higher and along a return arcuate path along the same side of the tree while he proceeds to pick the tree crop from that region of the tree, after which he may controllably cause the apparatus to move him slightly higher with respect to the tree and move him forwardly along an arc along the side of the tree positioned above the two preceding arcs of movement while he picks the tree crops from that portion of the tree.

This sort of operation may be continued by the operator's control of the apparatus which is actually carrying him above the ground on controllably positionable booms connected to the truck, until such time as the entire near side of the tree has had all of the tree crop effectively picked therefrom and fed into conveyor means carried by the booms whereby to transport the tree crop back to the truck receptacle and thence to the supplementary trailer or vehicle in the manner referred to hereinbefore.

The operator carried at the end of the boom may then controllably cause the boom to be repositioned adjacent the top of the next tree from which he may then pick the tree crop in a series of sequential successively lower arcuate paths of travel in the same general manner as that previously described in connection with the first tree except for the fact that this comprises a descending tree crop picking operation whereas the first tree crop picking operation referred to above comprised an ascending operation.

The apparatus of the present invention lends itself to this type of alternate stripping of the tree crop from the near half portions of trees along a row and on one side of the truck, while a second operator similarly carried by a boom positioned on the other side of the truck is similarly stripping the near sides of the row of trees along that side of the truck.

Thus it will be seen that, upon completion of a tree crop picking operation along one side of a row of trees, the return of the apparatus along the other side of said row of trees, and multiple repetitions thereof, will eventually result in the complete stripping of all tree crops from all trees—and will do so in a manner effectively minimizing the man hour picking time requirements and the cost per unit quantity of the tree crop being picked as compared to conventional tree crop picking methods and apparatus.

It is an object of the present invention to provide tree crops picking and transport apparatus of the character referred to above which is adapted to facilitate the rapid picking of a large quantity of tree crops and to do so in a manner such as to minimize the cost of the picking operation for a given quantity of the tree crop picked.

Furthermore, it is an object of the present invention to provide apparatus of the character referred to above which is of extremely rugged, reliable, foolproof and easy-to-operate construction such as to be conductive to widespread us of the apparatus.

Further objects are implicit in the detailed description which follows hereinafter and will be apparent to persons skilled in the art after a careful study thereof.

For the purpose of clarifying the nature of the present invention, one exemplary embodiment and two slight variations theerof including additional attachments are illustrated in the hereinbelow-described figures of the accompanying drawings and are described in detail hereinafter.

Figures 9, 10, 11:
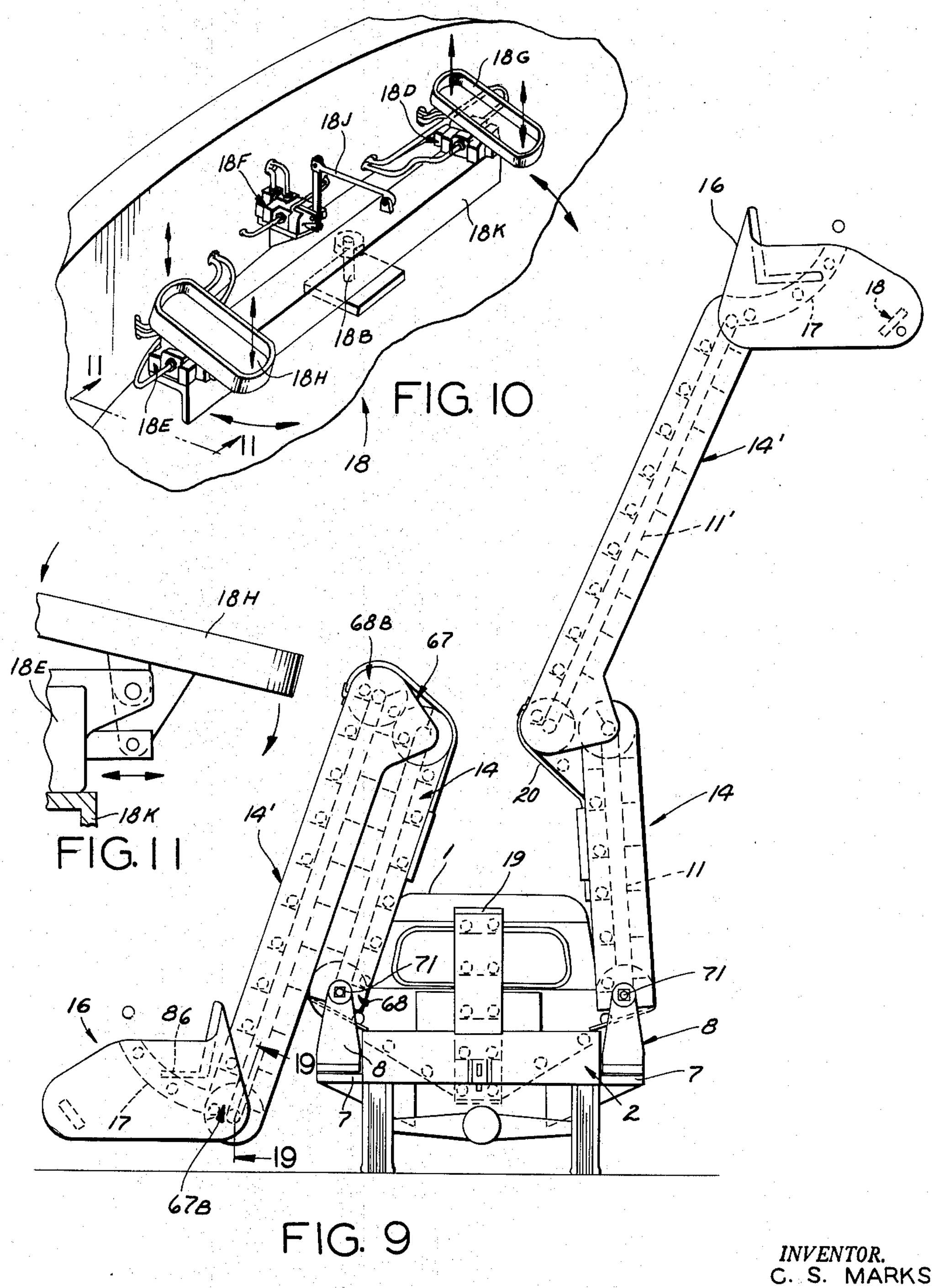
FIG. 9 is a rear elevational view of the apparatus of FIG. 5 with the two booms in different operative positions.
FIG. 10 is a fragmentary enlarged isometric view of the foot-operated control means carried within the cab and adapted for use in completely controlling the position thereof as the operator sitting in the cab determines.
FIG. 11 is a left side elevational view of FIG. 10 taken in the direction of the arrows 11—11 of FIG. 10.
Figure 13:
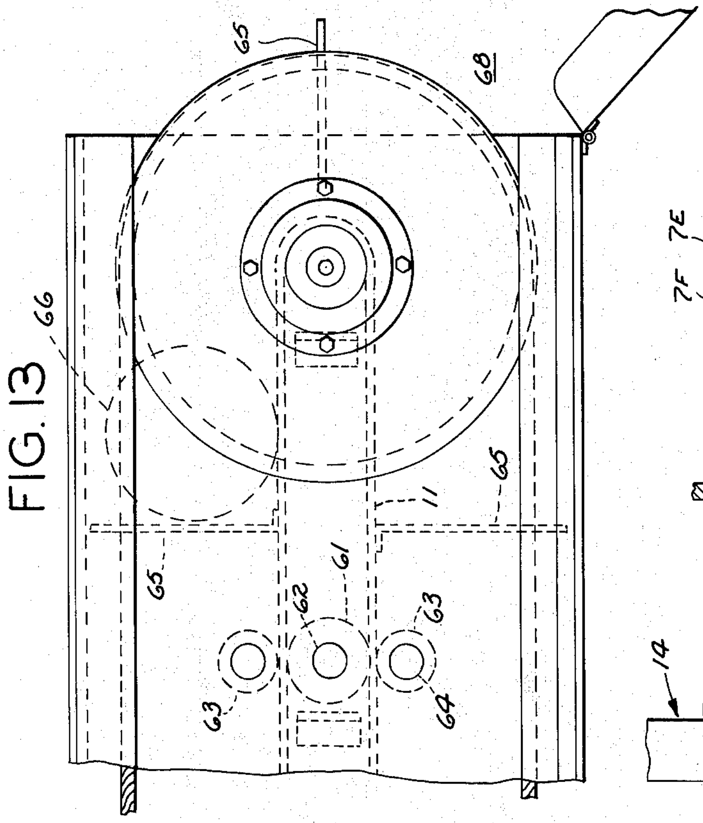
FIG. 13 is a fragmentary view taken in the direction of the arrows 13—13 of FIG. 12.
Figure 15:
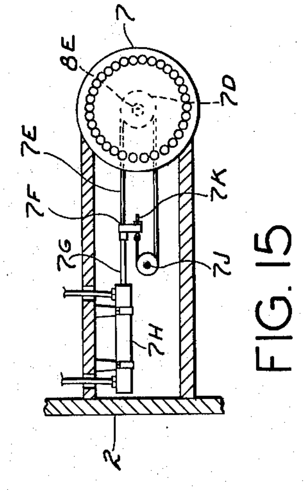
FIG. 15 is an enlarged fragmentary view taken in the direction of the arrows 15—15 of FIG. 14.
Figure 12:
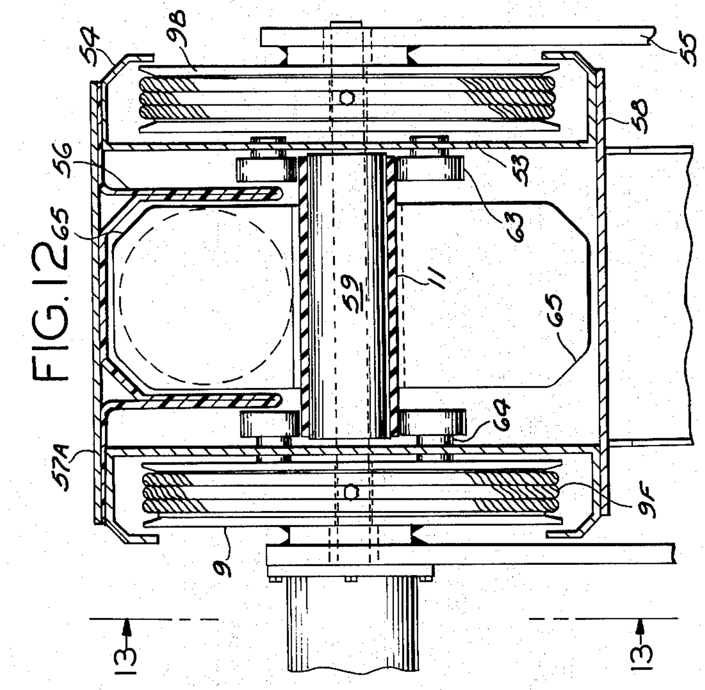
FIG. 12 is a view partly in section and partly in elevation taken in the direction of the arrows 12—12 of FIG. 4 and illustrates the connection of the lower boom section of one of the two booms to its underlying rotative boom mounting means carried at the side of the truck body.
Figure 14:
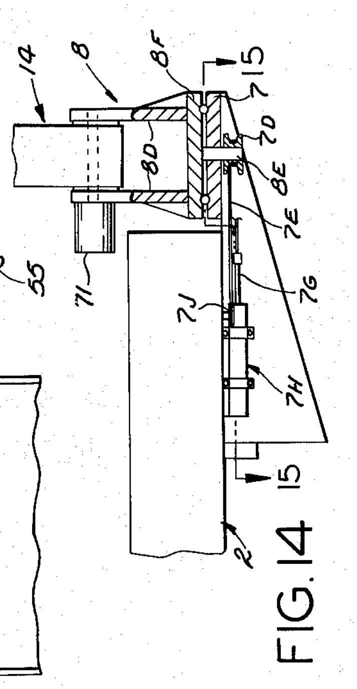
FIG. 14 is a fragmentary view (partly in elevation and partly in section and with certain parts removed) of one of the rotative boom mounting means and the actuating means for rotating same looking in the direction of the arrows 14—14 of FIG. 5.
Figures 16, 17, 18, 19:
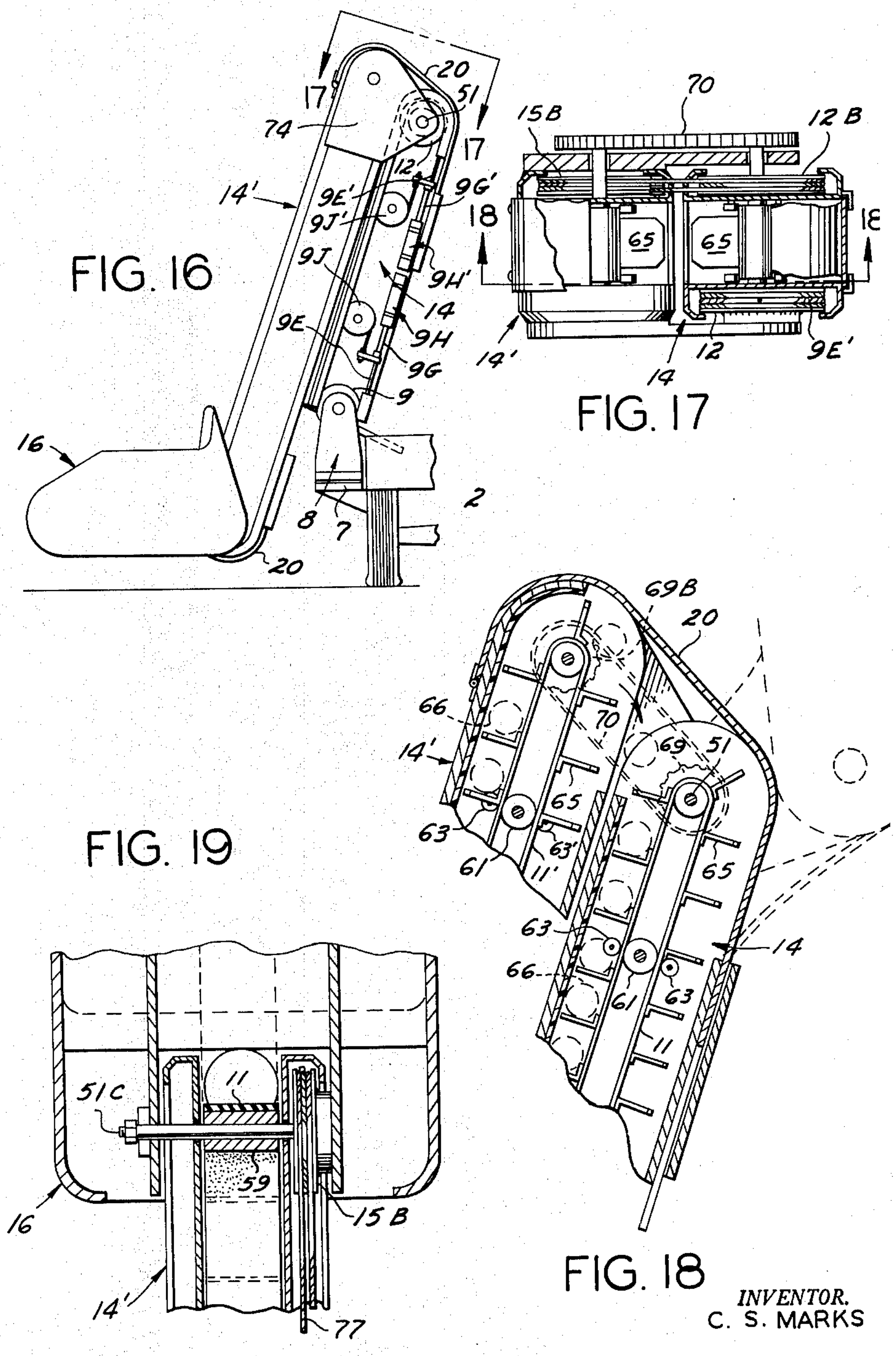
FIG. 16 is a view somewhat like the left portion of FIG 9 but does not show in broken lines the interior detail of the conveyor means but instead shows the exterior appearance of said boom including the hydraulic actuator for controllably positioning the boom; said actuator means not having been shown in FIG. 9 in order to avoid conflict with the interior broken-line showing of the conveyor belt.
FIG. 17 is an enlarged fragmentary view partly broken-away and with certain parts removed, looking in the direction of the arrows 17—17 of FIG. 16.
FIG. 18 is a view of aspect generally similar to FIG. 13 but with certain portions in section and certain portions in elevation illustrating the junction of the inner and outer boom sections as indicated by the arrows 18—18 of FIG. 17.
FIG. 19 is an enlarged fragmentary sectional view taken in the direction of the arrows 19—19 of FIG. 9 showing the detail of the connection of the outer end of one of the outer boom sections to the corresponding cab.
Figures 16A, 20, 21:
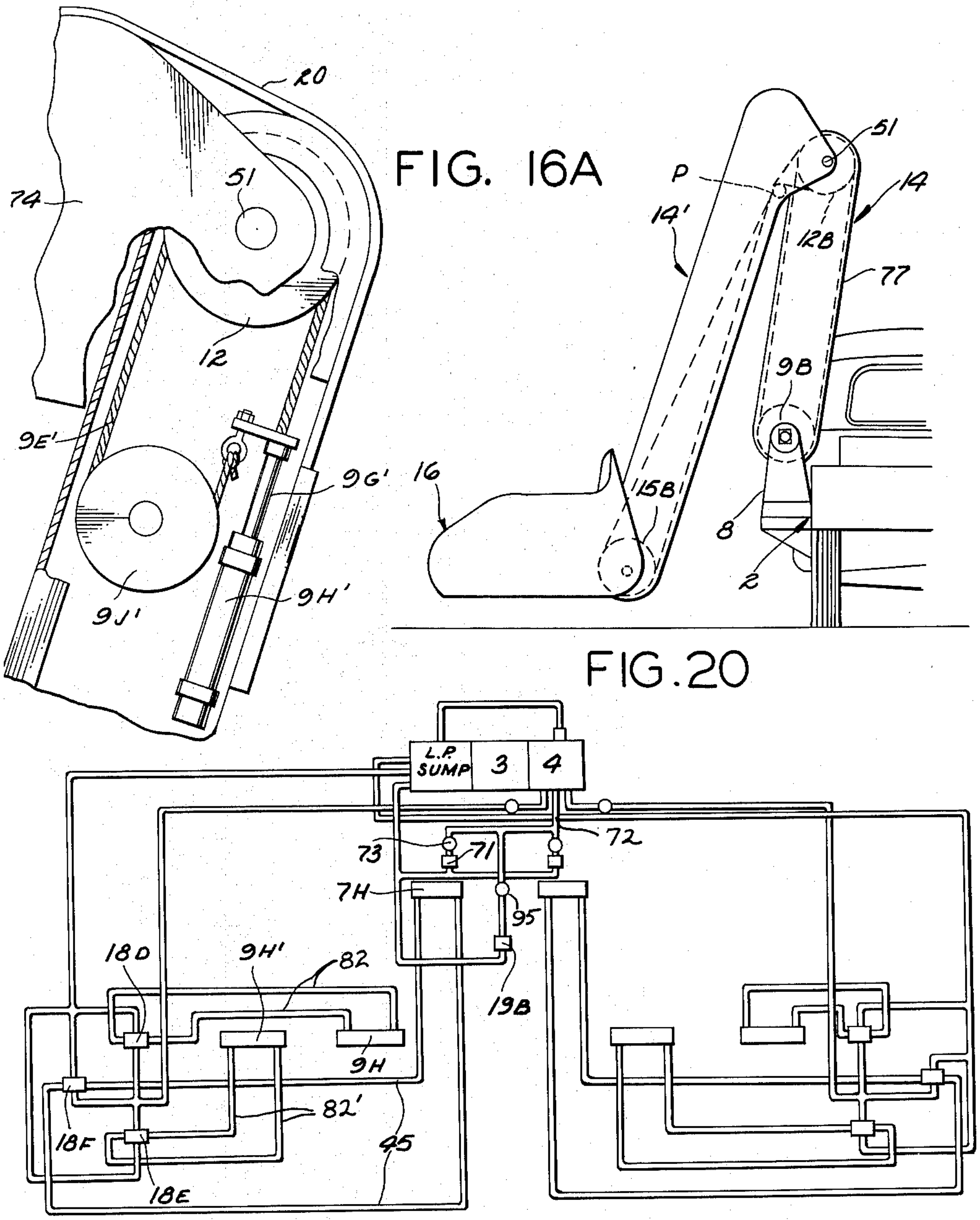
FIG. 16A is an enlarged fragmentary view of a portion of the apparatus shown in FIG. 16 showing in greater detail one of the hydraulic actuators; it being understood that the other is identical thereto although positionally reversed and, therefore, need not be illustrated in detail.

FIG. 20 is a fragmentary diagrammatic schematic view taken generally from a point ahead of the left hand boom shown in FIGS. 9 and 16 and is primarily intended to illustrate the detail of the parallelogrammic tensile linkage of said boom (it being understood that the other linkage of the other boom is identical) for at all times maintaining the cab carried by said boom in a true horizontal position.

FIG. 21 is a diagrammatic schematic hydraulic circuit view showing one exemplary hydraulic circuit arrangement adapted to operate the various elements of the invention, with each of said circuit elements in the overall circuit being of conventional construction and, therefore, requiring no specific and detailed illustration.

Figures 22, 23, 24, 25:
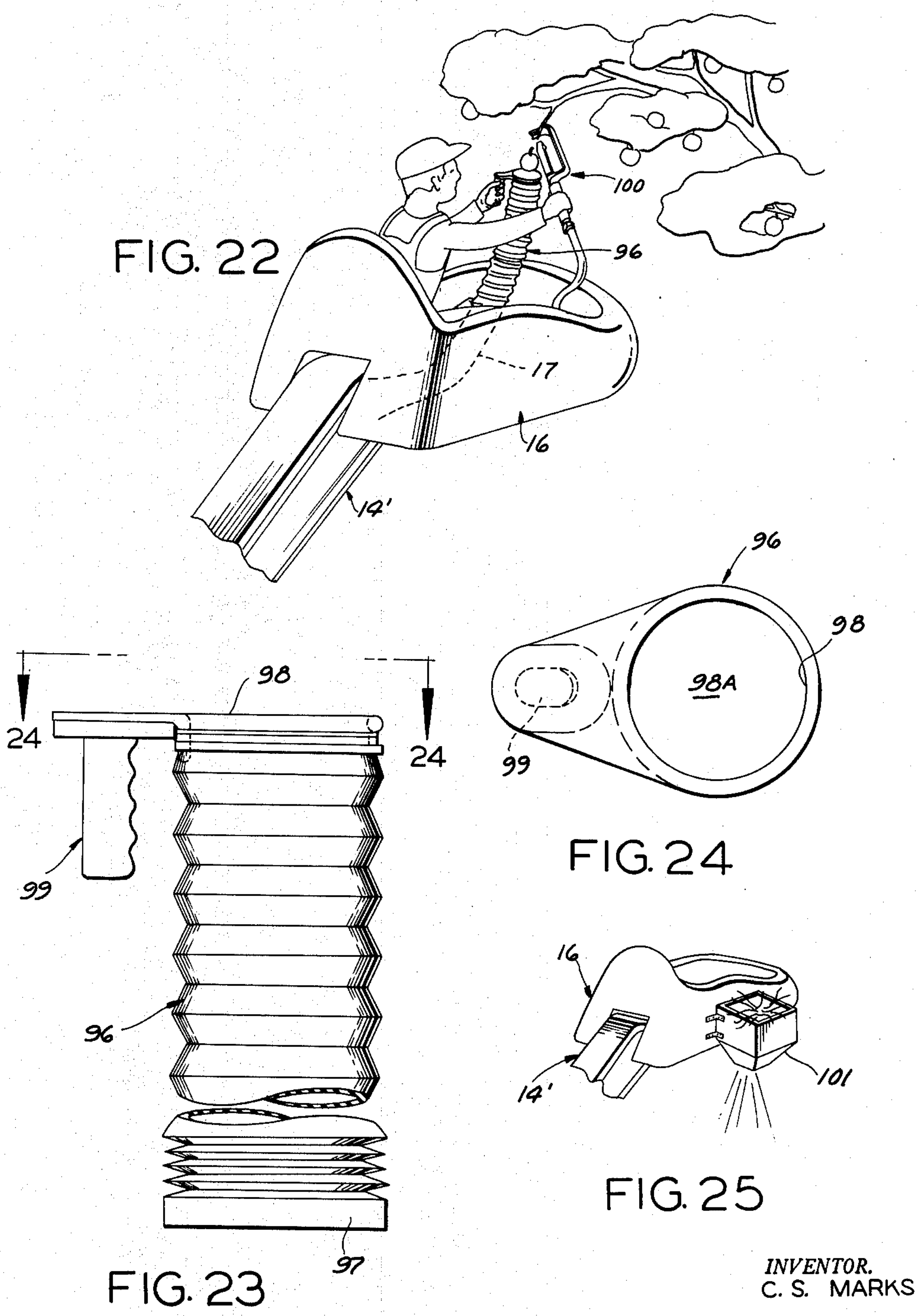

FIG. 22 is a fragmentary oblique isomeric view illustrating one of the cabs in the act of being used in one particular type of fruit-picking manner and employing a controllably extendable and positionally movable fruit-receiving and feeding means and also a power-operated fruit stem-cutting tool.

FIG. 23 is a larger scale, partly broken-away elevational view of the fruit-receiving and feeding means of FIG. 22.

FIG. 24 is a top plan view taken in the direction of the arrows 24—24 of FIG. 23.

FIG. 25 is a greatly reduced-size oblique isometric view of aspect similar to FIG. 22, but illustrating an additional attachment for the pod or cab comprising pulverizing means for receiving tree prunings, or the like, and pulverizing or shredding same.

It should be noted that the present invention is, broadly speaking, adapted for use wherever a controllable positionable boom means is required and, in particular, wherever a controllably positionable boom means is required for the purpose of picking some tree crop, or the like, which is to be automatically fed back through the boom means to receptacle means at the base thereof. However, one specific preferred embodiment of the present invention is particularly well adapted for picking fruit such as citrus fruit, or the like, and, therefore, the detailed description which follows hereinafter will so describe the apparatus. However, it should be understood that this is for exemplary purposes only and is not intended to limit the scope of the invention. Therefore, the use of the word "fruit" hereinafter is to be broadly construed in accordance with the statements just made above as to the scope of the present invention.

Referring to the figures for exemplary purposes, one illustrative embodiment of the invention takes a typical exemplary form wherein it comprises a pair of bearings, such as indicated generally at 10 and 10A, effectively connected with respect to a vehicle, such as is indicated generally at 1, which may comprise a truck, or like, although not specifically so limited. The two booms 10 and 10A are effectively fastened with respect to corresponding boom mounting means or bearings 8 and 8A carried at opposite sides of the truck receptacle, box, or bed, which is indicated generally at 2.

Each of the two boom means 10 and 10A is carried by the corresponding boom mounting means or bearings 8 and 8A for rotation around a vertical axis of rotation and also for rotation about a horizontal pivotal axis whereby each of the boom means (which is controllably foldable and extendable in a manner which will be explained in detail hereinafter) may be controllably rotated and/or elevated and depressed by appropriate actuator means under the control of an operator of the device sitting in the corresponding one of the outer pods, cabs, or picker-supporting means, such as indicated at 16 and 16A, respectively.

Figure 1:
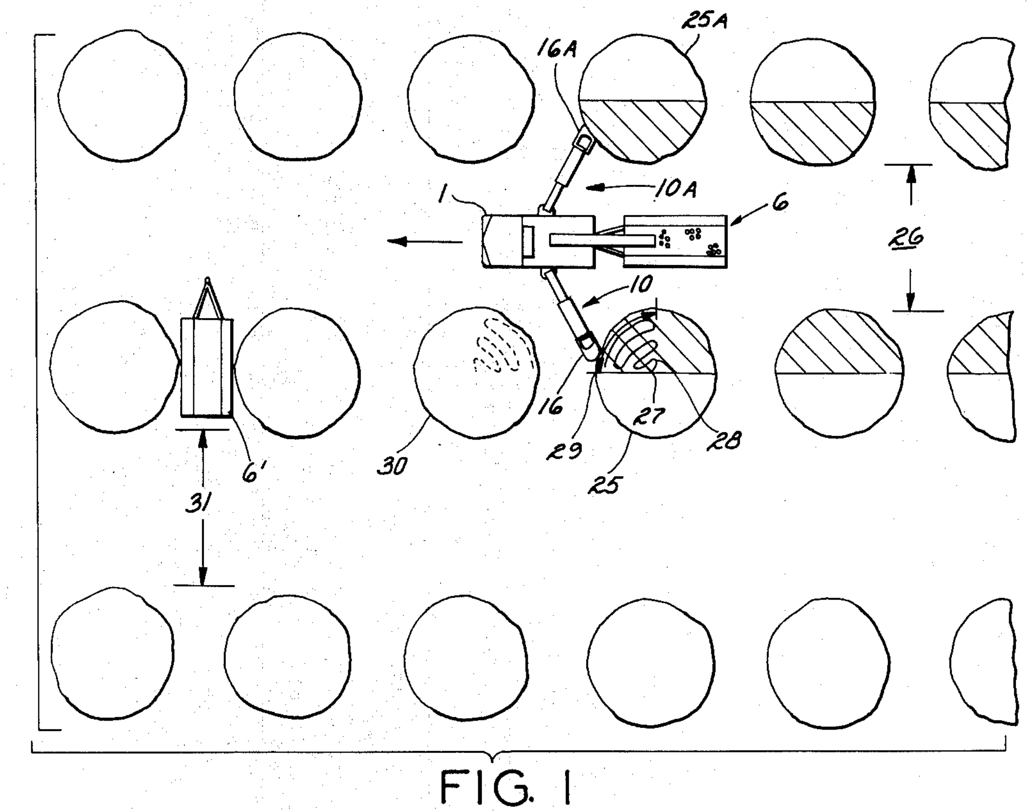
FIG. 1 is a greatly reduced-size diagrammatic or schematic plan view illustrating the use of one exemplary form of the present invention for picking and handling fruit from fruit trees arranged in a plurality of spaced rows.

This provides an arrangement such that an operator seated in the pod or cab 16 can cause the actuators to move the boom means 10 so as to position the pod or cab 16 at virtually any desired location for convenience in picking fruit from a fruit tree located alongside of the truck 1, such as the tree indicated at 25, for example, in FIG. 1. This is also true of an operator sitting in the other pod or cab 16A, who can control the positioning of his pod or cab for convenient picking of fruit from a tree, such as that shown at 25A, on the opposite side of the row or strip of ground space indicated at 26, between the laterally spaced rows of trees containing the first and second trees 25 and 25A.

Thus each of the two operators can cause his cab or pod, such as shown at 16 and 16A, to be moved to a position such as to allow him to start picking the adjacent tree along a high level such as indicated at 27 in FIG. 1.

As he strips the fruit from the tree, he will then cause the actuator to move his pod or cab 16 along the same level in an arcuate movement until he reaches a termination point, such as indicated at 28, at one end of said arc 27. Then he can controllably cause the pod or cab 16 to move downwardly and then, as needed, arcuately in the opposite direction from the first path of arcuate movement and this can be repeated all the way down the near side of the tree 25 until it has been completely stripped and the cab has arcuately moved forwardly along the lowermost path of travel best shown in FIG. 1, at which time the cab 16 will be positioned at an extremely low level at the point indicated at 29, and the operator may merely transfer his attention to the next adjacent tree 30 and proceed to pick it along a sequence of successively higher arcuate paths of travel until he reaches the top of the tree, at which time he will be prepared to pick the remainder of the near side of the tree 30 in the same manner as the initial picking operation described in connection with the first tree 25. This alternate descending and ascending path of arcuate travel of either of the cabs or pods 16 and 16A is then repeated along the entire row or strip of ground space 26 and the rows of trees and on each side thereof and is repeated as the apparatus is drawn along the next area of ground space 31 on the other side of the row of trees including the trees 25 and 30. It will readily be understood that when this operation has been completed, both sides of each row of trees will be stripped of fruit—and this fruit picking operation will have been performed in a highly efficient manner under the complete control of the operators carried in the two cabs 16 and 16A.

Since each of the boom means 10 and 10A is identical in structure, only one of them, such as the one shown at 10, will be described in detail; it being clearly understood that all of the structural features of the other boom means 10A are identical.

The boom means 10 includes a first or lower boom section 14 and a second or outer boom section 14'. The first or lower boom section 14 is connected to the boom mounting means 8 for rotation about a vertical axis of rotation and for rotation about a horizontal pivotal axis. In the example illustrated, this is accomplished by reason of the structure of the mounting means 8 and the attachment thereof to the lower end of the first boom section 14.

As illustrated, the boom mounting means 8 includes a base plate 7 which rotatably supports a vertical pin 8E which has a rotatable plate 8F attached to its upper end. The rotatable plate 8F carries two upstanding spaced members 8D whereby to define an upwardly directed bracket rotatable about the vertical axis of the pivot pin 8E, which has attached to its lower end a wheel means or drum 7D, which is adapted to be rotated by drive cable means 7E which passes completely around and is firmly fixedly attached to the wheel means or drum 7D. This is accomplished by connecting the drive cable means 7E, as indicated at 7F to the extensible and retractable connecting rod member 7G of the hydraulic actuator or jack means, indicated generally at 7H, which is carried by the truck 1 adjacent to and underneath the boom mounting means 8.

The drive cable 7E also passes around an idler wheel means or pulley sheave 7J rotatably carried by the truck body 2 whereby to maintain the drive cable 7E in taut condition. This is also facilitated by adjustable eye bolt means 7K for taking up any slack in the drive cable means 7E.

The hydraulic actuator or jack means 7H is connected by suitable conduit means 45 to a source of fluid under pressure such as the pump 3 and/or the high pressure reservoir 4 carried by the truck 1. The conduit means 45 also extends up the two beam sections 14 and 14' into the interior of the cab 16 where said conduit means 45 are connected to controllably operable flow-reversing hydraulic valve means, indicated generally at 18F, which is connected to a beam 18K which is vertically pivotally mounted, as indicated at 18B, and which is pedally operable about said pivot point 18B whereby to control the direction of flow of pressurized hydraulic liquid through the valve means 18F to the actuator or jack 7H. This will effectively extend or retract the connecting rod 7G in a manner such as to correspondingly rotate the plate 8F of the boom mounting means 8 around the vertical axis of the pivot pin 8E in either one direction or the other direction, which will effectively move the entire boom means 10 around a vertical axis extending through the pivot pin 8E. Thus, an operator of the device sitting in the cab 16 may swing it around a vertical axis into any desired position, at which time he may reposition the transverse beam 18K in a manner such as to cease further extension or retraction of the connecting rod 7G of the actuator 7H.

The two upstanding members 8D of the rotatable bracket of the boom mounting means 8 carry horizontal pivot pin means 8G which effectively pivotally mounts the lower end of the first boom section 14 for elevating and depressing movement about a horizontal axis passing through the horizontal pivot pin means 8G. This is accomplished by reason of the passing of the horizontal pivot pin means 8G through apertures indicated at 8H in the two side wall portions 53 of the lower boom section 14.

It should be noted that each of the side wall portions 53 has an outwardly and downwardly turned lip portion 54 at the top thereof in an outwardly and upwardly turned lip portion 55 at the bottom thereof. The top pair of outwardly turned lip portions 54 has fastened thereto suitable conveyor belt cover means 56, the purpose of which will be described in greater detail hereinafter, which is retained in position by fastening member means 57. A similar fastening member means 58 is connected across the two bottom lips 55, thus providing a hollow boom section structure 14 of great rigidity.

The central portion of the horizontal pivot pin 8G is provided with a sleeve 59 which is rotatably mounted thereon and which carries continuous flexible conveyor belt means 11. Said conveyor belt means 11 extends along virtually the entire length of the lower boom portion 14 with appropriate transverse idler rollers 61 being transversely positioned on central pivot pins 62 between side wall portions 53 of the lower boom section 14 along the length thereof whereby to interiorly support the flexible conveyor belt 11 along the length thereof.

Exterior top and bottom stub rollers 63 are carried on pivot shafts 64 along the length of the side wall portions 53 for top and bottom exterior contact with the flexible conveyor belt 11 in opposition to the interior or inner supporting idler rollers 61, thus positively maintaining the conveyor belt 11 in the proper position irrespective of the position and orientation of the entire boom section or portion 14.

The exterior surface (both top and bottom) of the conveyor belt 11 is provided along the length thereof with a plurality of substantially vertically projecting fruit-engaging portions such as indicated at 65. The upper fruit-engaging portions or projections 65 lie immediately inside of the conveyor belt cover 56, thus providing an arrangement whereby fruit, such as indicated at 66, will be positively transported along the length of the boom section 14 from the entry portion thereof, indicated at 67, to the exit portion thereof indicated at 68—and this will occur irrespective of the position and/or orientation of the boom portion 14.

Means is provided for driving the conveyor belt means 11' in the outer boom portion 14' as well as the conveyor belt means 11 in the inner boom portion 14. This is shown as comprising a sprocket wheel 69 rotatably mounted on the pivot pin 51 and effectively connected to the sleeve 59B carrying conveyor belt means 11. The sprocket wheel 69 is connected by drive chain means 70 to sprocket wheel 69B on shaft 51B on boom portion 14'. The pivot pin 8G and the sleeve 59 effectively connected thereto and carrying the conveyor belt 11 are directly driven by a fluid motor 71, which is connected by a conduit means 72 to the pump 3 and/or the high pressure reservoir 4 through control valve means 73 whereby to provide for continuous operation of the conveyor belt sections 11 and 11' when the apparatus is in use.

The second or outer boom portion 14' is constructed substantially identical to the first or lower boom section 14 and, therefore, a detailed description of the similar structural elements is thought to be redundant.

The lower end of the outer boom section 14' is provided with a pair of mounting bracket members 74 which are pivotally connected to the horizontal pivot pin 51 whereby to pivotally interconnect the two boom sections 14 and 14'. As previously mentioned, the sprocket chain 70 is connected between the sprocket wheel 69 and the sprocket wheel 69B whereby to drive the conveyor belt 11' in the second or outer boom section 14'.

A hinged spring biased hood or cover 20 is so positioned as to retain fruit fed from the terminus portion 68B of the conveyor belt 11' into the entry portion 67 of the conveyor belt 11 irrespective of the relative position of the two boom sections 14 and 14'.

The outer or second end of the outer or second boom section 14' is similar in construction to the first or inner end thereof except for the fact that no sprocket wheel and chain similar to the sprocket wheel 69 and chain 70 are provided.

The shaft 8G at the bottom of the first boom portion 10 carries spaced drums 9 and 9B which are effectively fixed with respect to the upstanding members 8D of the boom mounting means 8. The upper shaft 51 rotatably carries similar intermediate drums 12 and 12B. The shaft 51C at the outer end of the second or outer boom portion 14' rotatably carries a drum 15B on the same side as 12B and 9B; the drum 15B being fixed with respect to the pod or cab 16.

Longitudinal cable means 77, which effectively comprises leveling cable means, is provided and takes the form of a continuous cable which makes several turns around the lower drum or pulley 9B, then extends up the lower boom section 14 and around the intermediate pulley or drum 12B and then passes over an idler pulley P in the outer boom section 14' on its way to the outer drum or pulley 15B carried at the outer end of the outer boom section 14' where it makes several turns therearound and then returns back around the intermediate pulley 12B and on down to the bottom pulley 9B. Cable 77 is not fastened to the pulley 12B, but in the middle of each of the several turns on the lower pulley 9B and the upper pulley 15B, the cable 77 is securely fastened to each of these pulleys or drums.

The pulley 9B is fastened to one of the uprights 8D. The lower shaft 8G of the lower boom section 14 rotates in bearings in both of the lower pulleys 9 and 9B.

Pulley 12B is mounted on the upper shaft 51 of the lower boom section 14 and is free to rotate thereon and is not fastened to either boom section, although the pulley 12 is fastened to the outer boom section 14'. Pulley 15B is fastened to the pod 16 and the outer shaft 51C of the outer boom section 14' rotates in a bearing in said pulley 15B.

The cable 77 is preferably provided with take-up means in an accessible place where it does not run over any other pulley. In certain forms the idler pulley P may comprise such a tightener, although the invention is not specifically so limited.

The above effectively provides parallelogrammic tensile linkage means effectively interconnecting the boom mounting 8, and the cab 16 through the two boom sections 14 and 14' in a manner such as to maintain the cab 16 in a true horizontal position at all times.

The other two lower and intermediate drums 9 and 12 are individually provided with drive cable 9E and 9E' passing therearound and fixed with respect thereto and also passing around an auxiliary idler roller or sheaves 9J and 9J', respectively, with the tensile member or cable 9E or 9E', respectively, being connected to corresponding connecting rods 9G and 9G', respectively, of two corresponding hydraulic actuators 9H and 9H', respectively, carried back to back by the lower boom section 14 and each being provided with hydraulic circuit means or conduit means 82 and 82' connected to the pump 3 and/or high pressure reservoir 4 and also correspondingly to right and left pedally operable flow-reversing hydraulic valve means indicated generally at 18D and 18E, respectively.

These flow-reversing hydraulic valve means are connected to the two actuators 9H and 9H' for extension and retraction thereof in accordance with forward or rearward pivotal movement of operating foot pedals 18G and 18H, respectively. The arrangement is such that if an operator in the cab 16 presses his heel on the rear end of the pedal 18G, the lower or inner boom 14 is effectively lowered. If he raises his heel and presses his toe down on the front portion of the right pedal 18G, the inner boom portion 14 is raised. On the other hand, if the operator sitting in the cab 16 presses his heel down on the rear part of the left pedal 18H, this will effectively cause the outer boom portion 14' to be lowered because of the coupling of pulley 12 to mounting bracket member 74. If he raises his heel and presses his toe down on the left portion of the pedal 18H, the outer boom 14' will be raiesd. The above, together with the operation of the other flow-reversing hydraulic valve means 18F by pivoting of the beam 18K, which causes the entire boom 10 to be rotated about the pivot pin 8E of the boom mounting means 8, gives the operator in the cab 16 complete control of the positioning thereof by the actuator-control means, generally indicated at 18, so that his hands will remain free at all times for picking fruit and dropping it into a fruit-receiving chute 17, which is normally positioned between the operator's legs when he is seated on the seat 86.

This allows the picked fruit to drop down the chute 17 into the entry portion 67B at the outer end of the conveyor belt 11' carried by the outer boom section 14', where the fruit 66 will be received on the top of the conveyor belt 11' between adjacent ones of the fruit-engaging projections 65.

The operation of the conveyor belt will positively feed the fruit through the two boom sections 14' and 14 until the fruit is dropped into the truck receptacle 2 where the fruit will be received by the input portion, indicated a 87, of the conveyor belt means, indicated generally at 19, which extends from a lower apex portion 88 of the truck receptacle 2 angularly upwardly rearwardly to an output portion 89 where the fruit is fed into a towed supplementary trailer or a vehicle, indicated generally at 6, until such time as it is filled with the fruit, at which time it is disconnected from the truck 1 by a quick-release controllably disengageable hitch, indicated generally at 5, so that the loaded supplementary vehicle 6 will be left behind.

Figure 2:
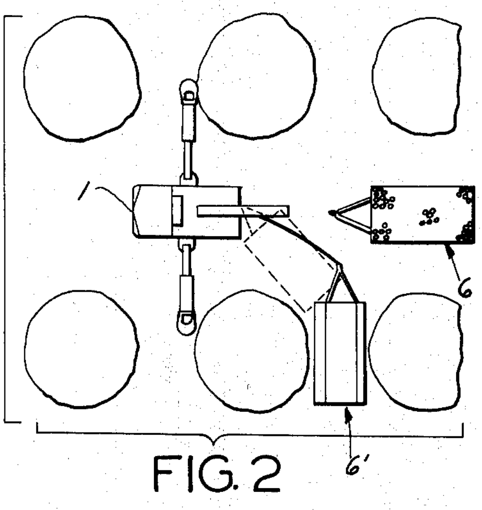
FIG. 2 is a fragmentary view similar to the left lower corner portion of FIG. 1 and illustrates primarily the advantageous mode of operation of the present invention wherein a loaded trailer is dropped and an empty supplementary trailer is power-winch-drawn into operative fruit-receiving relationship behind the fruit-picking truck.
Figure 3:
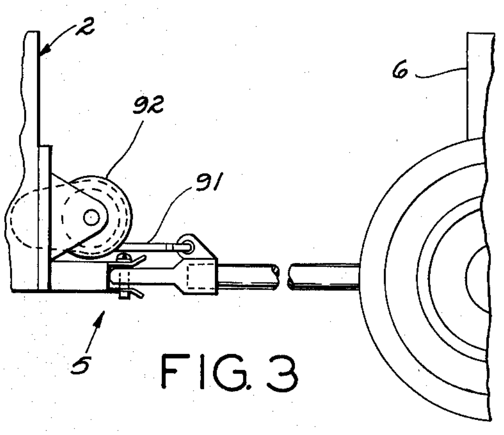
FIG. 3 is a fragmentary side elevational view of one exemplary form of the quick-release controllably disengageable hitch means of the present invention which makes possible the rapid trailer replacement operation referred to above in connection with FIG. 2.
Figure 4:
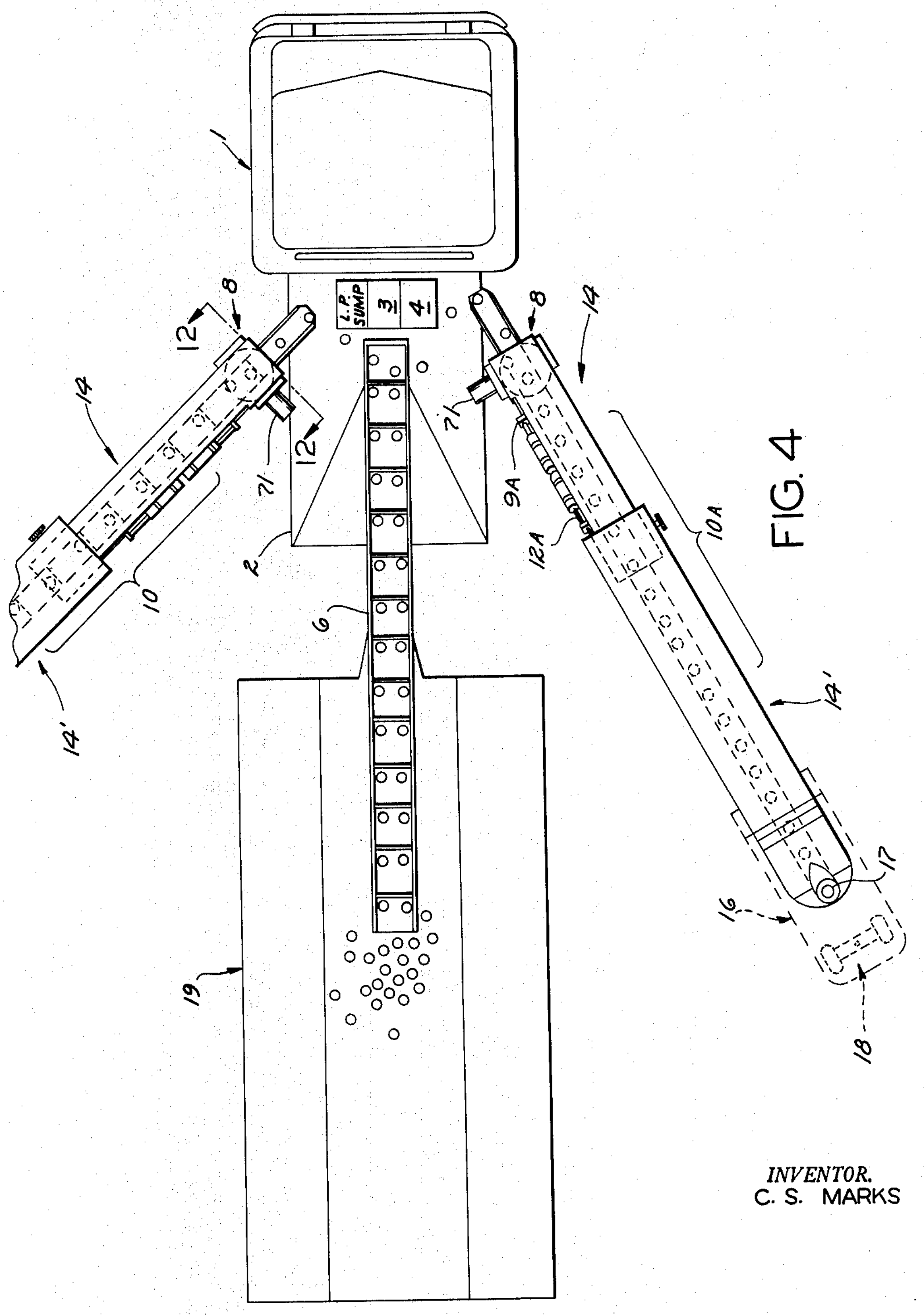
FIG. 4 is a larger-scale fragmentary top plan view of the truck, the trailer means towed thereby, and the fruit-picking apparatus carried by the truck body.
Figure 5:
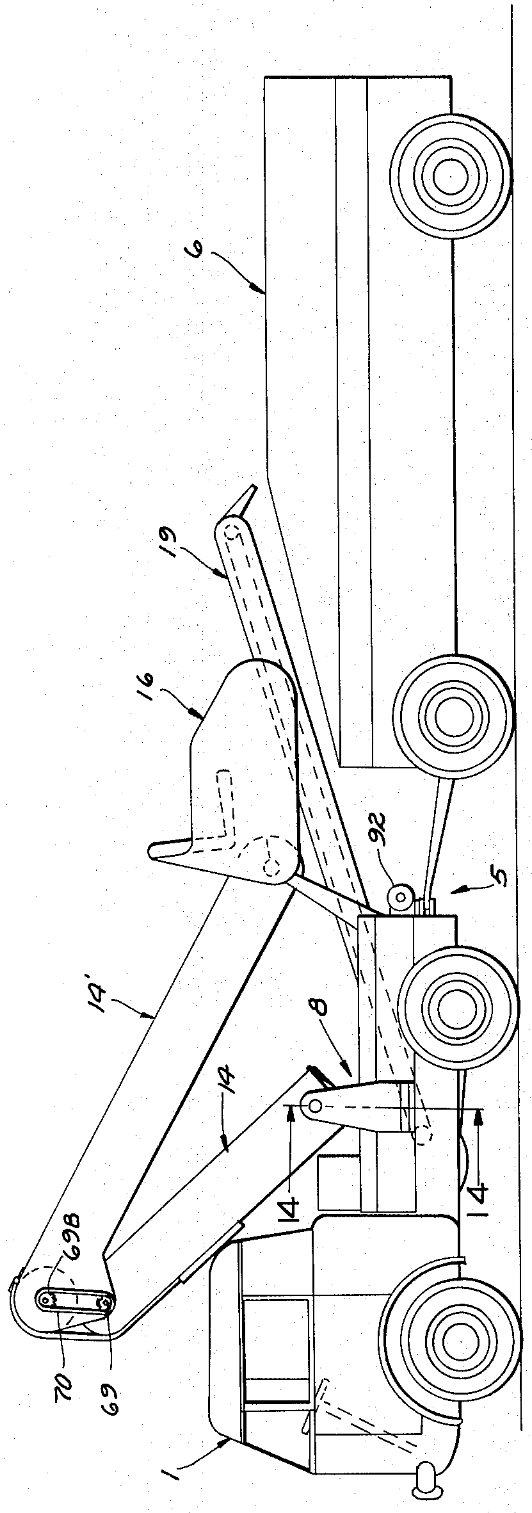
FIG. 5 is a side elevational view of the apparatus of FIG. 4 with each of the booms of the picker apparatus in similar positions different from those shown in FIG. 4 whereby the rear hand boom of FIG. 5 cannot be seen since it lies directly behind the near boom of FIG. 5.
Figures 6, 7, 8:
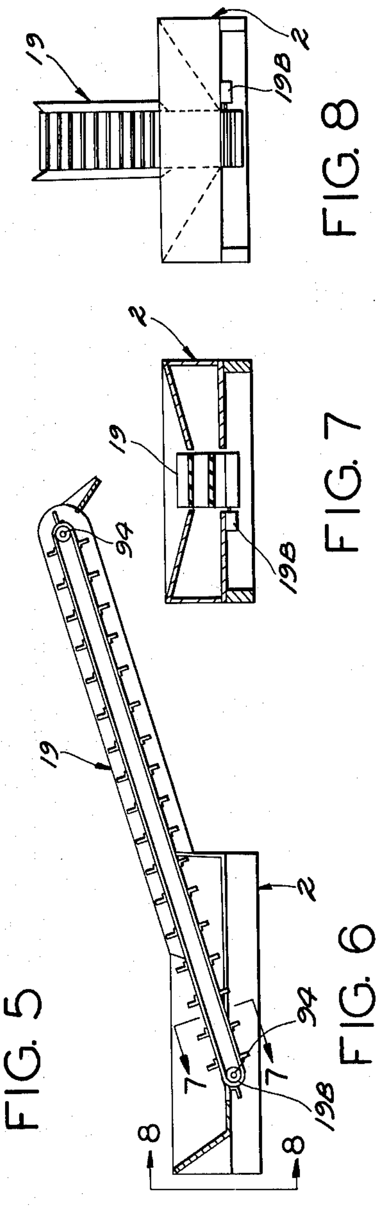
FIG. 6 is a smaller scale fragmentary view partly in section and partly in side elevation showing the truck receptacle or box of FIGS. 4 and 5 with the rest of the truck removed for drawing simplification and also showing the conveyor belt means which transports fruit therefrom to the rear supplementary vehicle or trailer.
FIG. 7 is an enlarged fragmentary sectional view, with parts removed, looking in the direction of the arrows 7—7 of FIG. 6.
FIG. 8 is a view, with parts removed, looking in the direction of the arrows 8—8 of FIG. 6.

After this has been accomplished, a second supplementary trailer or vehicle 6' which is empty and which is normally adapted to be positioned in a laterally offset location, as shown in FIGS. 1 and 2, is connected to the cable means, indicated at 91, for controllable operation by conventional power take-off means, hydraulic motor means, or the like (not shown) whereby to draw the empty vehicle 6' into position behind the truck 1 so that it may be loaded with fruit.

This dropping of a full trailer 6 and reconnecting of an empty trailer 6' in the very efficient manner just described can be repeated as often as needed and without in any way disturbing the continuous fruit picking and transporting operation of the apparatus of the present invention.

The conveyor belt 19 is mounted on conventional roller means 94 and is adapted to be driven by a fluid motor 19B connected to the pump 3 and/or high pressure reservoir 4 through shut-off valve means 95. The fluid motor means 19B which operates the power winch 92 (if one is used instead of a conventional power take-off) may also be similarly connected to the pump 3 and/or high pressure reservoir 4.

The interior detail of each of the three flow-reversing hydraulic valves 18D, 18E, and 18F carried by the cab 16 has not been shown in detail in the drawings nor described in detail in the specification since such controllably operable flow-reversing hydraulic valves are well-known in the art and the detail thereof comprises no part of the present invention. This is also true of the hydraulic actuators.

Each of the fruit-receiving chutes such as that shown at 17 may, in certain forms of the invention, as illustrated in FIGS. 22 and 23, be provided with controllably extendable and positionally movable fruit-receiving and feeding means, such as the bellows indicated generally at 96, which may be made of flexible hollow plastic construction, or the like, having its base end 97 fastened to the chute 17 and having its upper open end 98 attached to a manually graspable handle 99 whereby the open end 98 may be moved directly under a piece of fruit hanging on a tree, by one hand of an operator holding the handle 99, while the other hand of the operator holds a stem cutting tool 100 with which he quickly cuts the stem of the fruit as close to the fruit as possible, thus allowing the fruit to drop directly into the open top 98 of the bellows 96 under the action of gravity, after which it will be fed directly into the chute 17 and to the conveyor belt system in the manner described hereinbefore. The stem cutting tool may be of a manually powered type if desired.

Each of the cabs, such as the one shown at 16, may also be provided, if desired, with hydraulically operated pruning means (which may be of the type indicated at 100 in FIG. 22 or which may be of any other suitable type) which is adapted to power prune any undesired branches of a tree, which may then be dropped into pulverising means, such as indicated generally at 101, whereby to effectively pulverize or shred the pruned material to facilitate disposal thereof or to possibly allow use thereof as a soil mulch or nutrient material. In certain instances, the pulverizing means may comprise a mechanical limb shredder. However, it may take any suitable form.

It should be clearly noted that the means for driving the two conveyor belt sections 11 and 11′ in the two boom portions 14 and 14′ of either of the booms 10 or 10A may be modified somewhat from the form described in detail hereinbefore and specifically illustrated in the figures in order to provide an absolutely positive direct drive of the outer conveyor belt section 11′ from the fluid motor means 71 by way of two auxiliary sprockets (one being carried at the lower end of the inner boom portion 14 and the other being carried at the outer end thereof) effectively connected to the corresponding sleeves 59 and 59′, with said second sprocket being directly coupled to a sprocket equivalent to that shown at 69 and driving a chain equivalent to that shown at 70 whereby to positively drive the sprocket wheel 69B at the inner end of the outermost boom portion 14′ by way of said four sprockets and two sprocket chains and directly from the fluid motor 71. This will prevent any slippage in the drive.

It should be noted that I have chosen to describe in detail the booms 10 and have not specifically described in detail the boom means 10A. This is because they are substantially identical, although positionally reversed, and a complete detailed description of the boom means 10A would be redundant. However, I have numbered parts of the boom means 10A which correspond to those of the boom means 10 with the same reference numerals since said parts are identical. Thus the description set forth hereinbefore in connection with the boom means 10 is substantially applicable (with the exception of positional reversal) to the other boom means 10A.

To sum up, it should be noted that the cab 16 in use is in virtually constant motion under the control of the foot operable actuator-control means 18 so that the next piece of fruit to be picked is always in a conveniently accessible position.

Furthermore, it should be noted that fruit may be picked at virtually any height or location accessible to the apparatus and within the physical limitations of the structure thereof and may be picked close to or even off of the ground and still be transported to the trailer 6 just as easily as fruit located higher on the tree.

Furthermore, the comfortable sitting position enables an operator or picker to work with far less fatigue than when picked from a ladder or even from the ground.

Additionally, the use of the novel apparatus of the present invention greatly reduces damage to the trees and to the fruit during a picking operation by comparison with conventional prior art picking methods.

It should be noted that while the entire apparatus of the present invention has been shown in the drawings and has been specifically described herein as a hydraulically operated system, the invention is not specifically so limited but may employ various other forms of motors, such as electric motors, at each of the various locations where power is required, or may employ various other kinds of motors either positioned at each of the locations where power is required or centrally positioned and connected to each of said locations by suitable power transmission means.

It should also be noted that the design of the flight conveyor belts, the parallelogrammic linkage means, and the structure of the various mounts and boom sections themselves may be modified substantially within the basic spirit, scope, and/or teachings of the present invention.

It should be understood that the figures and the specific description thereof set forth in this application are for the purpose of illustrating the present invention and are not to be construed as limiting the present invetnion to the precise and detailed specific structure shown in the figures and specifically described hereinbefore. Rather, the real invention is intended to include substantially equivalent constructions embodying the basic teachings and inventive concept of the present invention.

I claim:

1. In a tree crop picker, the combination which comprises (a) a truck mounted on wheels,
(b) a fruit receiving box positioned on said truck,
(c) bearings positioned on sides of the truck,
(d) lower booms mounted to swing laterally on vertical axes in said bearings,
(e) outer booms carried by and pivotally mounted in extended ends of said lower booms,
(f) means extended around the connections of the outer booms to the lower booms preventing accidental displacement of fruit being transferred from said outer booms to said lower booms,
(g) cabs carried by extended ends of said outer booms,
(h) flight conveyors in said lower and outer booms,
(i) pedals mounted to travel in a horizontal plane for raising and lowering said outer booms,
(j) a trailer also mounted on wheels and designed to follow said truck,
(k) a conveyor mounted on said truck and positioned to deliver fruit to said trailer,
(l) foot controls mounted in said cabs for actuating the booms and cabs to position occupants of the cabs to fruit picking positions,
(m) drums and cables in connecting ends of the lower and outer booms for actuating the outer booms in relation to the lower booms to facilitate moving fruit pickers in the cabs to fruit picking positions,
(n) and hydraulic means for extending and retracting lower booms.

2. A tree picker comprising a vehicle having
(a) a bed mounted on wheels,
(b) boom carrying bearings mounted on an extended upwardly from said bed,
(c) lower booms pivotally mounted in said bearings, and positioned in vertically disposed planes,
(d) outer booms carried by and pivotally mounted in extended ends of said lower booms, said outer and lower booms being mounted to swing in vertically disposed planes,
(e) cabs carried by and pivotally mounted in outer ends of said outer booms,
(f) fruit conveying means in said booms,
(g) a conveyor belt mounted between said lower booms and positioned to deliver fruit from the booms to a trailer,
(h) hydraulic cylinders mounted in extended ends of said lower booms,
(i) lower pulleys rotatably mounted in extended ends of said lower booms,
(j) cables trained over said pulleys and connected at one of the ends thereof to connecting rods of said hydraulic cylinders and at the opposite ends to said outer booms,
(k) foot control means positioned in said cabs and operatively connected to said outer booms whereby the booms are actuated to fruit picking positions,
(l) and a pump for supplying fluid under pressure to said hydraulic cylinders.

3. A tree picker comprising a vehicle having
(a) a bed mounted on wheels,
(b) boom carrying bearings mounted on and extended upwardly from said bed,
(c) lower booms pivotally mounted in said bearings, and positioned in vertically disposed planes,
(d) outer booms carried by and pivotally mounted in extended ends of said lower booms, said outer and lower booms being mounted to swing in vertically disposed planes,
(e) cabs carried by and pivotally mounted in outer ends of said outer booms,
(f) fruit conveying means in said booms,
(g) a conveyor belt mounted between said lower booms and positioned to deliver fruit from the booms to a trailer (h) hydraulic cylinders mounted in extended ends of said lower booms,
(i) lower pulleys rotatably mounted in extended ends of said lower booms,
(j) cables trained over said pulleys and connected at one of the ends thereof to connecting rods of said hydraulic cylinders and at the opposite ends to said outer booms,
(k) foot control means positioned in said cabs and operatively connected to said outer booms whereby the booms are actuated to fruit picking positions,
(l) a pump for supplying fluid under pressure to said hydraulic cylinders,
(m) and take-up means in said lower booms for maintaining tension in said fruit conveying means.

4. In a tree crop picker the combination which comprises a vehicle having
(a) a bed,
(b) boom carrying bearings mounted on and extended upwardly from said bed,
(c) lower booms pivotally mounted in said bearings,
(d) outer booms carried by and pivotally mounted in extended ends of said lower booms,
(e) cabs carried by and pivotally mounted in outer ends of said outer booms,
(f) fruit conveying means in said booms,
(g) a conveyor belt mounted between said booms and positioned to deliver fruit from the booms to a vehicle, and
(h) durms and cables for actuating the outer booms in relation to the lower booms.

References Cited by the Examiner

UNITED STATES PATENTS

| | | | |
|---|---|---|---|
| 1,048,124 | 12/1912 | Ashworth | 198—87 X |
| 2,450,152 | 9/1948 | Miller | 214—83.1 |
| 2,616,768 | 11/1952 | Stemm | 214—83.1 X |
| 2,687,225 | 8/1954 | Martin | 214—505 |
| 2,795,346 | 6/1957 | Farmer | 214—653 |
| 2,821,312 | 1/1958 | Wiegel | 214—83.1 |
| 2,927,705 | 3/1960 | Girardi | 214—83.1 |

GERALD M. FORLENZA, *Primary Examiner.*

MORRIS TEMIN, HUGO O. SCHULZ, *Examiners.*